Figures 1, 2:
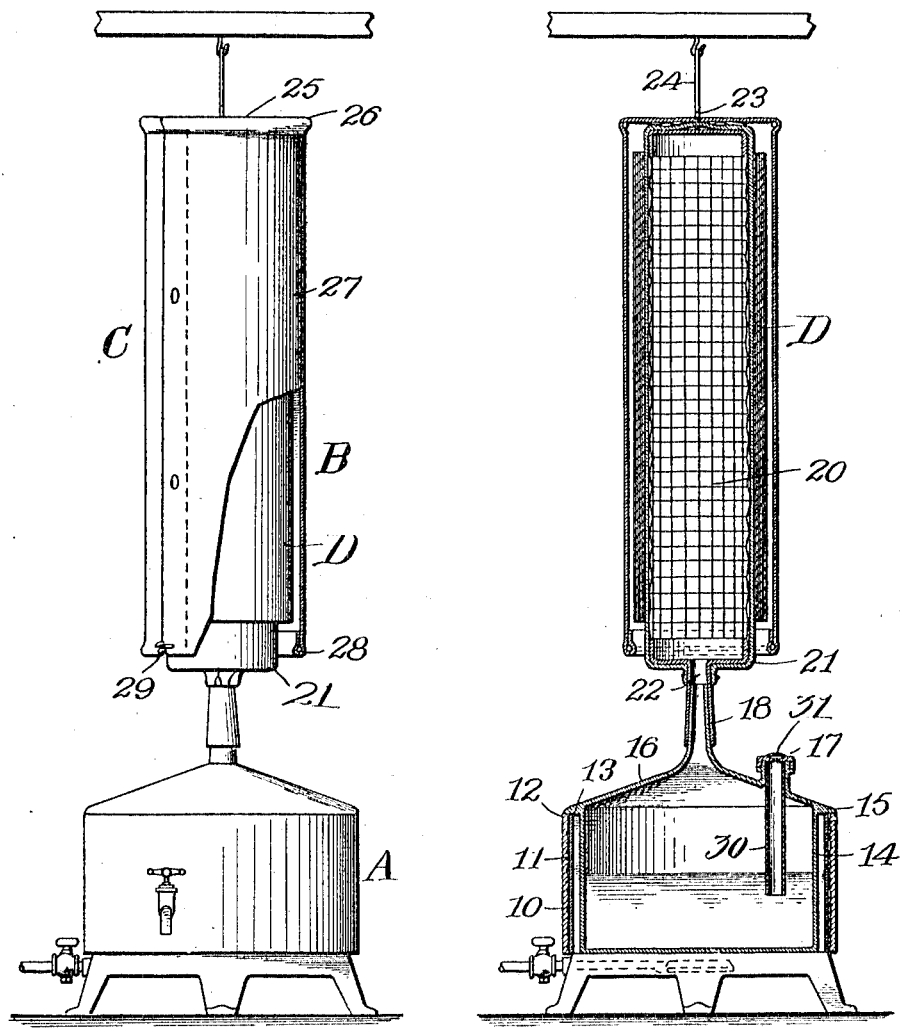

H. PESKIN.
APPARATUS FOR SPONGING AND SHRINKING CLOTH.
APPLICATION FILED MAY 9, 1914.

1,119,368.

Patented Dec. 1, 1914.
2 SHEETS—SHEET 1.

Witnesses.

Inventor
Hyman Peskin,
By Attorneys
Southgate & Southgate

H. PESKIN.
APPARATUS FOR SPONGING AND SHRINKING CLOTH.
APPLICATION FILED MAY 9, 1914.
1,119,368.
Patented Dec. 1, 1914.
2 SHEETS—SHEET 2.
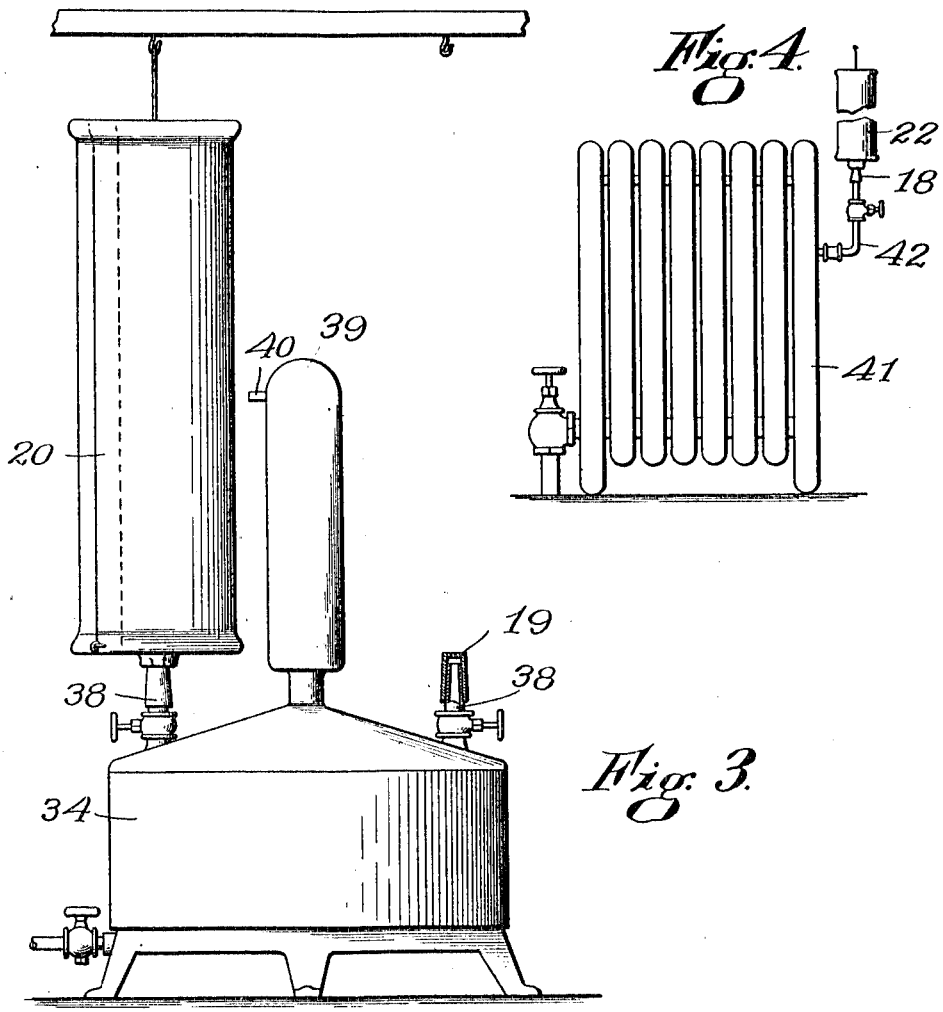
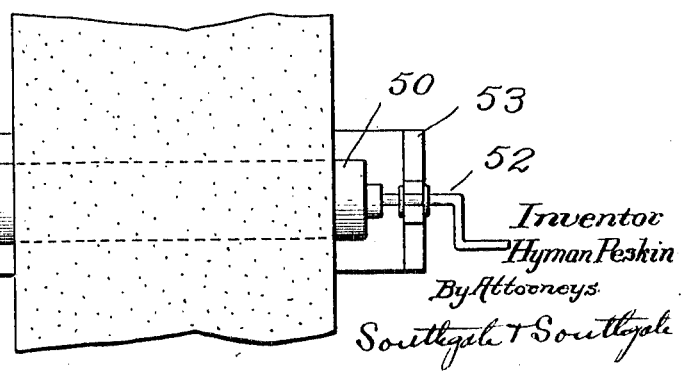

UNITED STATES PATENT OFFICE.

HYMAN PESKIN, OF WORCESTER, MASSACHUSETTS.

APPARATUS FOR SPONGING AND SHRINKING CLOTH.

1,119,368.   Specification of Letters Patent.   Patented Dec. 1, 1914.

Application filed May 9, 1914. Serial No. 837,422.

*To all whom it may concern:*

Be it known that I, HYMAN PESKIN, a citizen of the United States, residing at Worcester, in the county of Worcester and State of Massachusetts, have invented a new and useful Apparatus for Sponging and Shrinking Cloth, of which the following is a specification.

Cloth used for suits, overcoats, and the like, is sold in such condition that before it is made up it generally has to be moistened, or sponged, as it is called. For this purpose devices have been used in shops that are quite expensive and not specially convenient. The tailors and dressmakers ordinarily are not able to perform this operation in a convenient and satisfactory manner with the devices now on the market, but usually send them to factories that have large and expensive sponging devices, or else have to take up considerable time in the operation.

The principal object of this invention is to provide an efficient apparatus for sponging cloth capable of convenient use in small shops and by custom tailors and dressmakers, and also capable of sponging old cloth.

The invention also involves the provision of an apparatus for this purpose at such a small expense that any one doing a small business can afford to own one so that the expense of the sponging operation will be very greatly reduced; also an apparatus for this purpose which will take up but little space and which can be dismantled and removed without the expenditure of much time or labor.

A further object of the invention is to reduce the amount of steam consumed and to provide a construction by which the steam can be made by any convenient kind of a heater for the water, electric, gas, self-heater, coal, or any other kind.

The invention is of such a simple nature that it can be operated by unskilled help without any danger of damage to the cloth or to the apparatus.

Reference is to be had to the accompanying drawings, in which,

Figure 1 is a front elevation of a device constructed in accordance with this invention; Fig. 2 is a central, vertical section thereof; Fig. 3 is a side view of a modification. Fig. 4 is a side view showing how the principle can be applied to a steam radiator; and Fig. 5 is a plan showing the use of another form of the invention for velvet.

In the form shown in Figs. 1 and 2 the invention comprises two parts, a steam producing means A and a device B for using the steam for the purpose of sponging and shrinking the cloth.

The steam producing means shown is preferably made of comparatively small size so that it can be applied to a stove or any other form of heater, but it can be made in large sizes for use in large shops and factories. As shown it consists of an outer shell 10 formed of sheet metal preferably and having outside the sheet metal a layer of wire fabric 11 in which is embedded an insulating layer of asbestos composition 12. Any other composition can be substituted for the purpose of keeping the heat from passing through the wall of the outer receptacle. The bottom of this receptacle is intended to rest on the heating device with which it is used. At the top it is provided with a central opening 13. Through this opening depends a water can 14 which has an upper flange 15 by which it rests on the top of the receptacle 10 and it depends down into it nearly to the bottom. It has a sloping top 16 and a closure 17 of an ordinary kind through which it can be filled with water. The top gradually converges to form a conical outlet 18.

When this device is being heated for the purpose of boiling the water and forming steam, it is set on the stove or the like and a whistle 19 applied to the top of the outlet 18 so as to warn the user when the steam has been generated. This whistle is shown only in Fig. 3, but is intended to be used on all the forms. In the use of the device for its intended purpose the whistle is removed and in its place is placed the sponging device B. This comprises a cylindrical tube 20 formed of wire fabric and covered with cloth 21. It has an inlet 22 which fits the outlet 18 and supports the sponging device B. At the top the tube 20 has an eye 23 by which a flexible connection, as for example, a string 24, can be connected from it to the ceiling to help support it. Over the outside of this tube is placed a jacket C. This consists of a flat top 25 resting on the top of the cylinder and formed of canvas. It is perforated at the center for the passage of the string 24. Surrounding this flat top is a wire ring 26 and depending from that is a canvas cover 27 which is open along one side vertically. The sides of this opening overlap each other. At the bottom the canvas covering is provided with a wire 28 which is provided with two hooks 29 at its ends so that its ends can be connected. These hooks are located at the ends of the flap. This covering is of sufficient size to extend down around the walls of the cylinder and remain at a distance from them all around. It is open at the bottom, but when the bottom wire is closed the slit through its wall is practically closed.

In use the boiler A is heated until steam begins to be generated, which passing through the whistle warns the operator that it is ready for use. Then the whistle is removed and the tube B placed upon the boiler being supported by the string and by the boiler itself. The cloth D is wound around the cylinder, being held by pins, and the outer covering or jacket C applied. It will be obvious that the steam generated will pass upwardly into the tube and out through its walls in a uniform manner. Thus it penetrates the goods wound thereon and thoroughly saturates the same with steam. At the same time the jacket or covering C serves to hold the steam in and prevents any great amount of it being lost, while at the same time, it permits any excess to be discharged at the bottom. In this way the cloth is not only saturated with the steam, but it is held in a moist atmosphere for any period of time required for this operation and is soaked with the moisture. It is found in practice that the sponging or shrinking operation is performed by this apparatus in a few minutes and in an extremely uniform and satisfactory manner. Its expense is very low both for construction and operation, and no skill is required in carrying out the process with it.

In order to give warning when the water gets low an open-bottomed tube 30 is set into the filling opening, and the closure is provided with a whistle 31. Then when the level of water gets below the bottom of this tube the steam will blow the whistle.

In the form shown in Fig. 3 the water receptacle 34 has two outlets 38 for two tubes 20. The whistle 19 is shown on one of them. A steam chamber 39 is also provided with a valve 40 to regulate the pressure.

In Fig. 4 an ordinary steam radiator 41 is shown having a pipe 42 therefrom provided with a valve and with a conical end to which the tubes 20 can be supplied.

In Fig. 5 the horizontal tube 50 has an inlet pipe 51 and a crank 52 which support it in bearings on a frame 53. The velvet is fed over the tube by turning the crank.

Although I have illustrated and described only a few embodiments of the invention I am aware of the fact that many other modifications can be made therein by any person skilled in the art without departing from the scope of the invention as expressed in the claims. Therefore I do not wish to be limited to all the details of construction herein shown and described, nor to the particular manner of operating the device, but What I do claim is:—

1. In a device for sponging and shrinking cloth, the combination of a vertical tubular support for the cloth having an inlet at the bottom for steam and comprising a body pervious to steam and having an outer surface upon which the cloth can be wound, and a tubular cover therefor hanging down from the top thereof and surrounding said support, but of larger diameter so as to provide a space for retaining steam.

2. In a device of the character described, the combination with means for generating steam provided with a vertical upwardly opening outlet, of a support for the cloth to be shrunk, comprising a tube having a covering of cloth on which the cloth to be shrunk can be wound and provided with means at the bottom for attaching it to the outlet of the steam generating means, and a canvas covering surrounding said tube but spaced therefrom for holding the steam in the space between it and the tube.

3. In a device of the character described, the combination of a support for the cloth having an inlet for steam and comprising a body pervious to steam and having an outer surface upon which the cloth can be wound, and a covering for said support comprising a flat top supported by the top of the support and a cylindrical main portion depending therefrom and surrounding the support, said cylindrical portion having a diameter larger than the support to afford a space between it and the support for the retention of steam.

4. In a device of the character described, the combination of a supporting tube for the cloth comprising a body pervious to steam upon which the cloth can be wound, and a covering for said support comprising a cylindrical main portion surrounding the tube, said cylindrical portion having a diameter larger than the tube to afford a space between it and the tube for the retention of steam, and means extending upwardly from the top of said tube for assisting in supporting the tube and the covering.

In testimony whereof I have hereunto set my hand, in the presence of two subscribing witnesses.

HYMAN PESKIN.

Witnesses:
ALBERT E. FAY,
C. FORREST WESSON.